United States Patent
Wycech

[11] Patent Number: 5,992,923
[45] Date of Patent: Nov. 30, 1999

[54] REINFORCED BEAM ASSEMBLY

[75] Inventor: Joseph S Wycech, Grosse Pointe Woods, Mich.

[73] Assignee: Henkel Corporation, Gulph Mills, Pa.

[21] Appl. No.: 09/085,487

[22] Filed: May 27, 1998

[51] Int. Cl.$^6$ .................................................. B62D 25/04
[52] U.S. Cl. ............................ 296/188; 280/805; 297/471
[58] Field of Search ...................... 296/188, 189, 296/146.6; 280/801.1, 801.2, 805; 297/471, 472; 293/109, 120

[56] References Cited

U.S. PATENT DOCUMENTS

| | | |
|---|---|---|
| 3,123,170 | 3/1964 | Bryant . |
| 3,493,257 | 2/1970 | Fitzgerald et al. . |
| 3,868,796 | 3/1975 | Bush ................................ 296/146.6 X |
| 3,964,208 | 6/1976 | Renner et al. .................... 296/146.6 X |
| 4,090,734 | 5/1978 | Iami et al. . |
| 4,238,540 | 12/1980 | Yates et al. . |
| 4,369,608 | 1/1983 | Miura et al. ..................... 296/146.6 X |
| 4,397,490 | 8/1983 | Evans . |
| 4,559,274 | 12/1985 | Kloppe et al. . |
| 4,610,836 | 9/1986 | Wycech . |
| 4,751,249 | 6/1988 | Wycech . |
| 4,836,516 | 6/1989 | Wycech . |
| 4,853,270 | 8/1989 | Wycech . |
| 4,861,097 | 8/1989 | Wycech . |
| 4,901,500 | 2/1990 | Wycech . |
| 4,908,930 | 3/1990 | Wycech . |
| 4,922,596 | 5/1990 | Wycech . |
| 4,923,902 | 5/1990 | Wycech . |
| 4,978,562 | 12/1990 | Wycech . |
| 4,995,545 | 2/1991 | Wycech . |
| 5,122,398 | 6/1992 | Seiler et al. . |
| 5,124,186 | 6/1992 | Wycech . |
| 5,255,487 | 10/1993 | Weiting et al. . |
| 5,575,526 | 11/1996 | Wycech . |
| 5,743,588 | 4/1998 | Ufrecht ................................ 296/146.6 |
| 5,755,486 | 5/1998 | Wycech ................................... 296/188 |
| 5,791,687 | 8/1998 | Gotou et al. ............................ 280/805 |

FOREIGN PATENT DOCUMENTS

| | | |
|---|---|---|
| 0 061 131 | 9/1982 | European Pat. Off. . |
| 0 453 777 A2 | 10/1991 | European Pat. Off. . |
| 29 19 046 | 11/1980 | Germany . |
| 90 11 147 U | 12/1990 | Germany . |
| 5389920 | 2/1993 | Japan . |
| 628868 | 3/1947 | United Kingdom . |
| 2061 196 | 5/1981 | United Kingdom . |
| 2197 267 | 5/1988 | United Kingdom . |
| WO 89/06595 | 7/1989 | WIPO . |
| WO 93/05103 | 3/1993 | WIPO . |

*Primary Examiner*—Joseph D. Pape
*Attorney, Agent, or Firm*—Ernest G. Szoke; Wayne C. Jaeschke; Stephen D. Harper

[57] ABSTRACT

A reinforced beam assembly includes a channel-shaped beam which has an internal reinforcement member located within the channel. The reinforcement member is of generally W-shape and functions as a carrier for an expandable foam located between the inner surface of the reinforcement member and the inner surface of the beam. Upon expansion the foam is bonded to both surfaces.

17 Claims, 2 Drawing Sheets

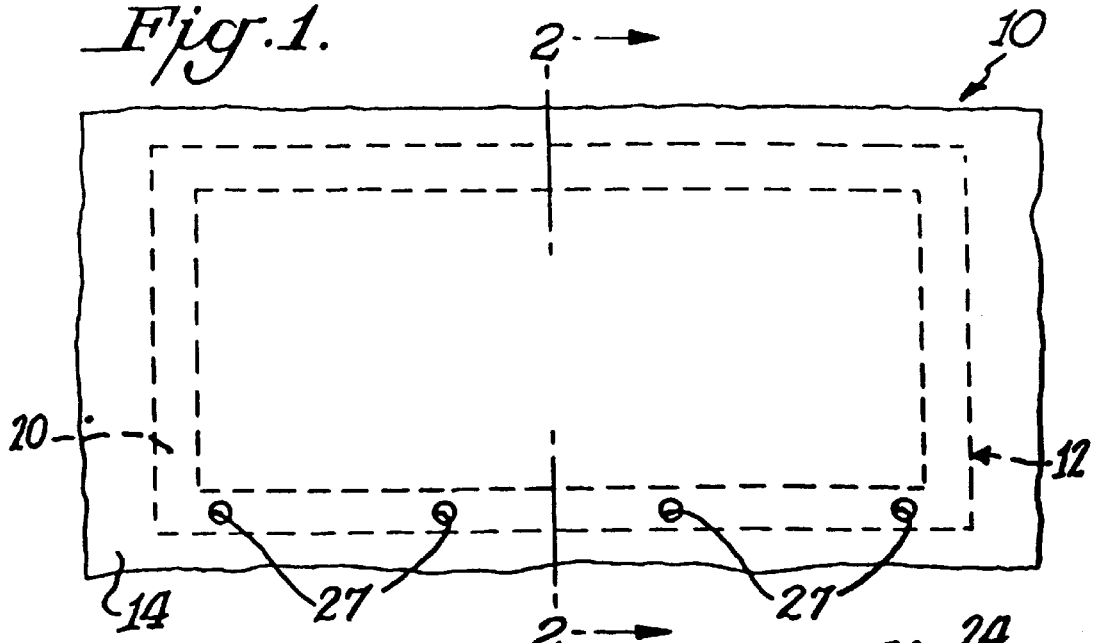
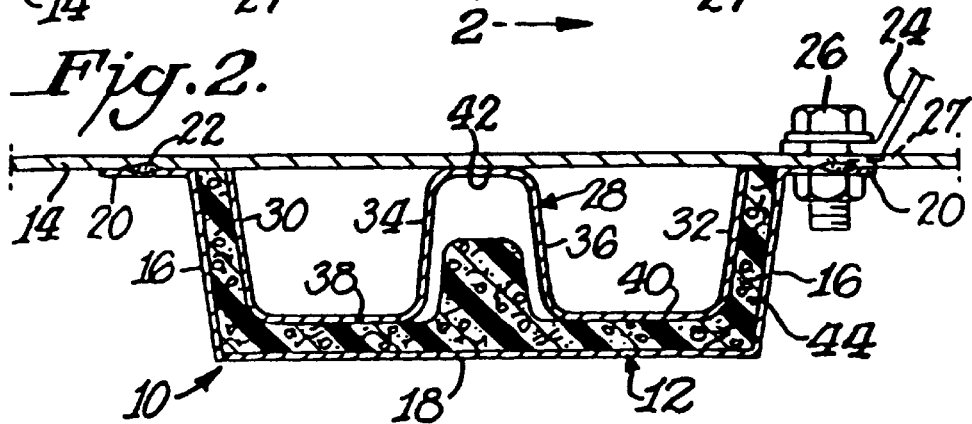
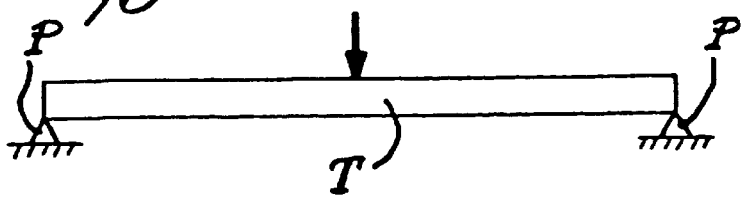
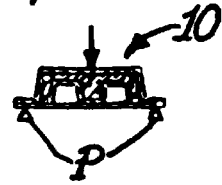
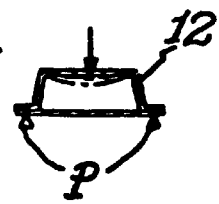

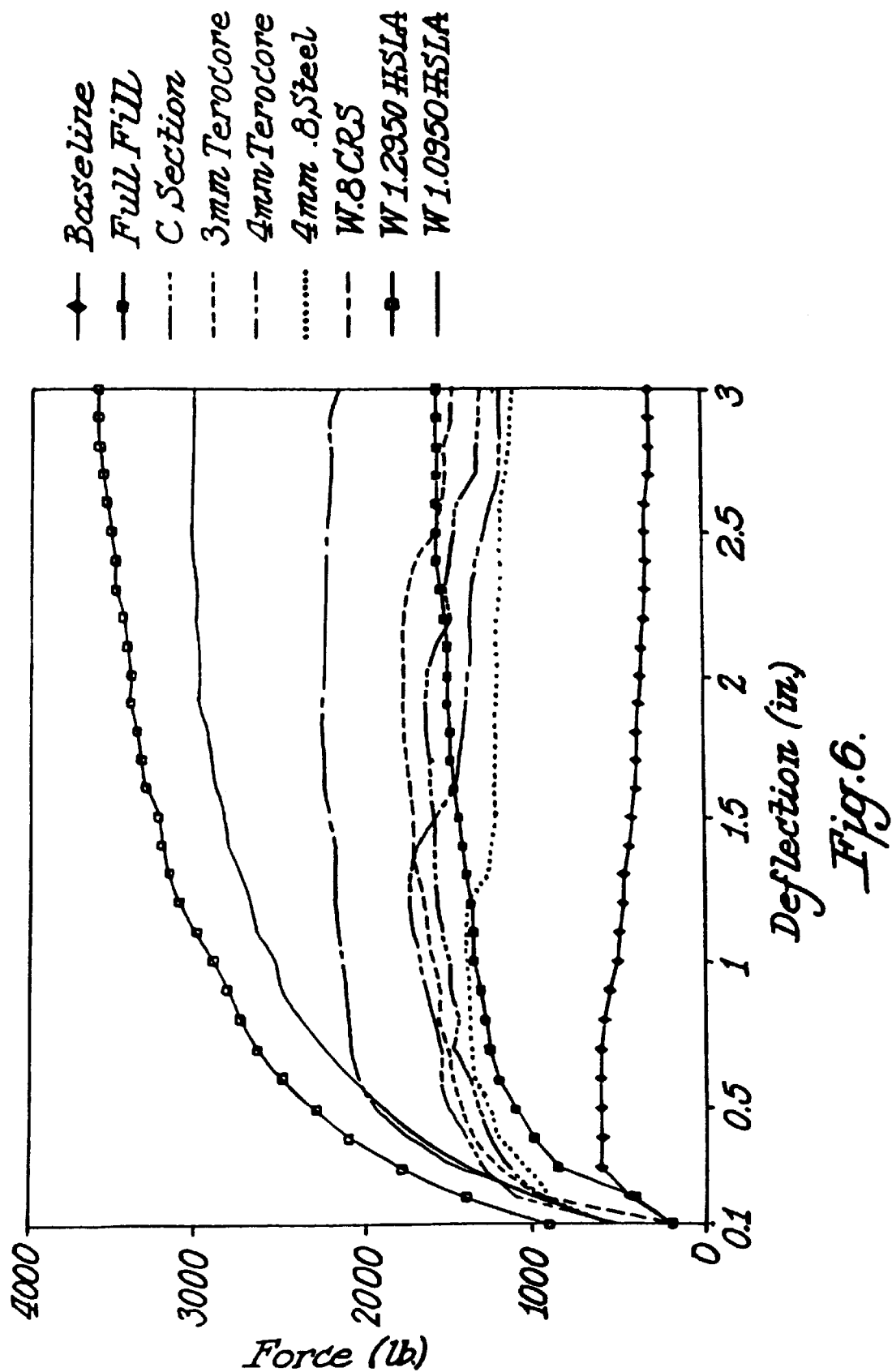

REINFORCED BEAM ASSEMBLY

BACKGROUND OF THE INVENTION

In various practices, particularly in the automotive industry, it is desirable to reinforce various beams. For example, a channel shaped beam having side walls joined by an intermediate wall might be used in an environment, such as a seat belt anchor rail, wherein the interconnecting intermediate wall would be subject to compression. It would be desirable to provide some form of support or reinforcement at the compression space or wall of the beam. Attempts have been made, for example, to completely fill the channel with a foam material. Other attempts have included providing an inner member within the channel which is also of channel or C-shape and with a foam therebetween.

SUMMARY OF THE INVENTION

An object of this invention is to provide an internal reinforcement arrangement for a channel shaped beam.

A further object of this invention is to provide such an internal reinforcement arrangement which includes an internal reinforcement member located within the channel but spaced from the channel walls with expandable foam therebetween.

A still further object of this invention is to provide a method of reinforcing a channel shaped beam.

In accordance with this invention a channel shaped beam includes an inner surface defined by side walls and an interconnecting intermediate wall. A reinforcement member is located within the channel with at least a portion of the reinforcement member having its inner surface spaced from the inner surface of the beam. That portion of the reinforcement member is of a shape which includes hills and valleys and preferably is of W-shape. An expandable foam material is located in the spacing between the inner surface of the beam and the inner surface of the reinforcement member. The foam material becomes bonded to both inner surfaces upon expansion of the foam material.

In a preferred practice of this invention the W-shape for the internal reinforcement member is formed by having four inclined generally vertical legs with each pair of legs joined by a horizontal section. A cap may be located over the beam and internal reinforcement member. In one practice of the invention the beam is part an anchor rail in an assembly in a vehicle for attaching seat belts. The cap would comprise the floor and the seat belts would be anchored to the floor.

THE DRAWINGS

FIG. 1 is a top plan view of a portion of a vehicle which utilizes the reinforced beam assembly of this invention;

FIG. 2 is a cross-sectional view taken through FIG. 1 along the line 2—2 but showing an attached seat belt;

FIG. 3 is a schematic view in elevation showing a test procedure for determining load deflection;

FIG. 4 is a cross-sectional view in elevation showing use of the test procedure on a reinforced beam assembly in accordance with this invention;

FIG. 5 is a view similar to FIG. 4 showing a comparative test procedure on a beam assembly which does not include any inner reinforcement; and FIG. 6 is a graph showing comparative deflection results.

DETAILED DESCRIPTION

The present invention will be described with respect to a reinforced beam assembly which is particularly designed to be used as part of a seat belt anchor rail assembly in a vehicle. It is to be understood, however, that such description is for exemplary purposes only. Thus, the concepts of the invention could be applied to other parts of a vehicle or to other objects such as aircraft, ships and the like wherever it is desired to provide some reinforcement, particularly, reinforcement of a channel-shaped beam.

FIGS. 1–2 show a reinforced beam assembly 10 as used for part of a seat belt anchor rail assembly. As shown therein, a channel shaped beam 12 made of any suitable material such as steel is mounted below the floor 14. Beam 12 may be of any suitable construction and preferably includes a pair of diverging side walls 16,16 interconnected by a generally horizontal intermediate wall 18. Side walls 16 terminate in horizontal flanges 20 which are in contact with floor 14 and connected to the floor in any suitable manner such as by spotweld 22. Floor 14 thus functions as a cap for the channel shaped beam.

As shown in FIG. 2 a seat belt 24 is secured to floor 14 by any suitable fastening arrangement 26 such as a nut and bolt assembly extending through a hole 27. As shown in FIG. 1, four such holes for four fastening arrangements are used to anchor the seat belt to the rail or beam 12. Beam 12 would extend longitudinally under floor 14 and would be significantly longer than it is wide. The specific dimensions are not critical for an understanding of this invention.

In accordance with this invention an internal reinforcing member 28 is mounted within the channel of beam 12. Reinforcing member 28 preferably is in a form which includes a plurality of hills and valleys. In the preferred practice of the invention which is illustrated in FIG. 2 reinforcing member 28 is generally of W-shape having a pair of outwardly diverging generally vertical walls 30,32 with inwardly converging walls 34,36. Walls 30,34 are joined by a generally horizontal wall 38 and similarly walls 36 and 32 are joined by a generally horizontal wall 40. Walls or segments 38 and 40 are disposed toward the intermediate connecting wall 18 of beam 12. Walls 34 and 36 are joined by a generally horizontal wall 42 which is disposed toward and may be in contact with cap or floor 14. If desired, reinforcing member 28 may include additional generally vertical and generally horizontal walls. Similarly, if desired, the various inclined generally vertical walls may be connected directly to each other at a point rather than having intermediate horizontal sections. The inclusion of the horizontal sections and the shaping of the reinforcing member as being generally a W in the form illustrated in FIG. 2, however, represents the preferred practice of the invention in that the inner surfaces of walls 30,38,40 and 32 are generally parallel to the inner surface of walls 16,16 and 18 of beam 12 to provide a generally uniform spacing between most of the reinforcement member and the walls of beam 12. The inclusion of a horizontal section 42 is also desirable because it provides a potential for surface contact with the floor or cap 14.

In the preferred practice of this invention inner reinforcing member 28 is of uniform thickness and is preferably made of metal although other materials such as plastic can also be used. Depending on the desired end results, member 28 may be made from foil of 0.002 to 0.005 inches thick or may be made from sheet material from 0.006 to 0.020 inches thick or may be made of plate from 0.020 to 0.125 inches thick.

Where used as part of a seat belt anchor assembly each wall or leg 30,32,34,36 may have a perpendicular height of 23.8 mm. The angle between walls 30 and 38 and between walls 32 and 40 may be 97.6° degrees while the angle between walls 34 and 38 and between walls 36 and 40 may be 93°. The distance between the center line of member 28 to the outer end of wall 30 or wall 32 may be 37.8 mm.

As shown in FIG. 2 a polymer layer 44 is bonded to portions of inner reinforcement member 28. Thus, reinforcement member 28 functions as a carrier for the polymer layer. Polymer layer 44 is preferably an expandable foam which would expand when activated to completely fill the space between the inner surface of beam 12 and the inner surface of reinforcement member 28 and would preferably be bonded to both inner surfaces. A preferred polymer foam is a heat expandable foam such as described in U.S. Pat. No. 5,575,526 all of the details of which are incorporated herein by reference thereto. The advantage of a heat expandable foam in connection with a vehicle beam is that the foam would expand when the portion of the vehicle including the beam 12 would be subjected to heat such as by the conventional coating processes used in vehicle manufacture. Thus a separate heating step is not needed to activate the foam. While a heat expandable foam is preferred, the invention may be practiced with other types of similar foams which, however, are chemically activated. Thus, any suitable foam such as a thermoset and/or expandable resin based foam may be used in the practice of this invention. The polymer layer 44 which is bonded to the carrier or reinforcement member 28 and to the parent member or beam 12 would be 0.08 to 0.200 inches thick when used as part of a seat belt anchor assembly. See, FIG. 4 which shows the foam 44 completely filling the space between the inner surfaces of beam 12 and member 28 although FIG. 4 shows the beam assembly in an inverted position for test purposes.

FIG. 3 schematically illustrates the test set up for a three point bend test. As shown therein, the test product T is held at its ends by support points P,P. A load is applied centrally between test points P,P which would correspond to the compression face of the test member T. Thus, for example, the outer surface of inter-connecting intermediate wall 18 would be the compression face of beam 12. Measurements would be taken of the amount of deflection in accordance with the application of loads or forces. FIG. 4 schematically illustrates the test procedure of FIG. 3 used with the assembly 10 of this intention. FIG. 5 illustrates the same test procedure used with a beam 12 which has no internal reinforcement.

FIG. 6 is a graph showing the deflections under different loads for various types of beam reinforcements. As shown therein, base line refers to the type of beam illustrated in FIG. 5 having no reinforcement. Full fill refers to a beam completely filled, such as with a foam. C-section refers to a beam having an inner C-shaped or channel shaped reinforcement. Other comparisons are with 3 mm Teracore®, 4 mm Teracoreo and 4 mm 0.8 steel. Each of these beam conditions represent practices which are not practices of the invention. The last three tests, namely, W 0.8CRS, W 1.2DF140 and W 1.0DF140 represent beams which are reinforced with the invention. The dimensions are in reference to inches. CRS is an abbreviation for cold rolled steel. DF refers to di-form. As illustrated in FIG. 6 the three practices of the invention require a much greater force to cause the same amount of deflection that results with the comparative practices.

The invention thus provides a lightweight support to the compression face of a beam along with the vertical sheer webs. The configuration of the internal reinforcement member offers more mass and a more cost efficient means of reinforcing a beam in bending over conventional practices such as filling a section solid with foam.

I claim:

1. A reinforced beam assembly comprising a beam having a channel shaped inner surface defined by side walls and an interconnecting intermediate wall, a reinforcement member in said beam, said reinforcement member being within the channel of said beam, at least a portion of said reinforcement member being spaced from said inner surface, said portion of said reinforcement member having an inner surface disposed toward said inner surface of said beam, said inner surface of said portion of said reinforcement member being defined by a plurality of hills and valleys, a foam material located in the spacing between said inner surface of said beam and said inner surface of said reinforcement member for being bonded to said inner surface of said beam and said inner surface of said reinforcement member upon expansion of said foam material, said beam having side walls connected to each other by an interconnecting wall, and said reinforcement member having outer walls disposed toward and generally parallel to said side walls of said beam.

2. In the assembly of claim 1 wherein reinforcement member is generally W-shaped.

3. A reinforced beam assembly comprising a beam having a channel shaped inner surface defined by side walls and an interconnecting intermediate wall, a reinforcement member in said beam, said reinforcement member being within the channel of said beam, at least a portion of said reinforcement member being spaced from said inner surface, said portion of said reinforcement member having an inner surface disposed toward said inner surface of said beam, said inner surface of said portion of said reinforcement member being defined by a plurality of hills and valleys, a foam material located in the spacing between said inner surface of said beam and said inner surface of said reinforcement member for being bonded to said inner surface of said beam and said inner surface of said reinforcement member upon expansion of said foam material, said reinforcement member being generally W-shaped, and said W-shaped reinforcement member includes a pair of outer generally vertical diverging legs disposed toward and parallel to said side walls of said beam.

4. The assembly of claim 3 wherein said foam material is an expandable foam which completely fills said spacing between said inner surface of said beam and said inner surface of said reinforcement member upon expansion of said foam material.

5. The assembly of claim 4 wherein said portion of said reinforcement member comprises said entire reinforcement member.

6. The assembly of claim 5 wherein said W-shaped reinforcement member includes two generally vertical inclined converging legs between said outer diverging legs, and each pair of adjacent legs being connected by a horizontal segment.

7. The assembly of claim 6 including a cap mounted over and completely closing said channel.

8. The assembly of claim 7 wherein said foam material is heat expandable.

9. The assembly of claim 8 wherein said beam is part of a vehicle.

10. The assembly of claim 9 wherein said beam and said cap and said reinforcement member are all made of metal.

11. The assembly of claim 9 wherein said beam comprises a seat belt anchor rail, said cap comprising the floor of said vehicle, and a seat belt anchored to said floor.

12. The assembly of claim 6 wherein said reinforcement member is in the form of a foil of 0.020–0.005 inches thick.

13. The assembly of claim 6 wherein said reinforcement member is a sheet having a thickness of 0.006–0.020 inches.

14. The assembly of claim 6 wherein said reinforcement member is a plate having a thickness of 0.020–0.125 inches.

15. A method of reinforcing a beam assembly comprising providing a channel shaped beam having an inner surface defined by side walls and an inter connecting intermediate wall, mounting a reinforcement member of generally W-shape within the channel of the beam and with an expandable foam material bonded to the reinforcement member on an inner surface of the reinforcement member disposed toward the inner surface of the channel of the beam, expanding the foam into intimate contact and bonding with the inner surface of the channel and the inner surface of the reinforcement member, and mounting a cap over the channel of the beam to close the channel and enclose the reinforcement member therein.

16. The method of claim 15 wherein the beam is a seat belt anchor rail of a vehicle and the cap is the floor of the vehicle, and mounting a seat belt to the floor.

17. A reinforced beam assembly comprising a beam having a channel shaped inner surface defined by side walls and an interconnecting intermediate wall, a reinforcement member in said beam, said reinforcement member being within the channel of said beam, at least a portion of said reinforcement member being spaced from said inner surface, said portion of said reinforcement member having an inner surface disposed toward said inner surface of said beam, said inner surface of said portion of said reinforcement member being defined by a plurality of hills and valleys, a foam material located in the spacing between said inner surface of said beam and said inner surface of said reinforcement member for being bonded to said inner surface of said beam and said inner surface of said reinforcement member upon expansion of said foam material, and said beam including a cap covering said channel shaped inner surface.

* * * * *